March 22, 1938.　　R. R. SEEBER ET AL　　2,111,695
METHOD OF MAKING PIPE FITTINGS
Filed March 23, 1934　　3 Sheets-Sheet 1
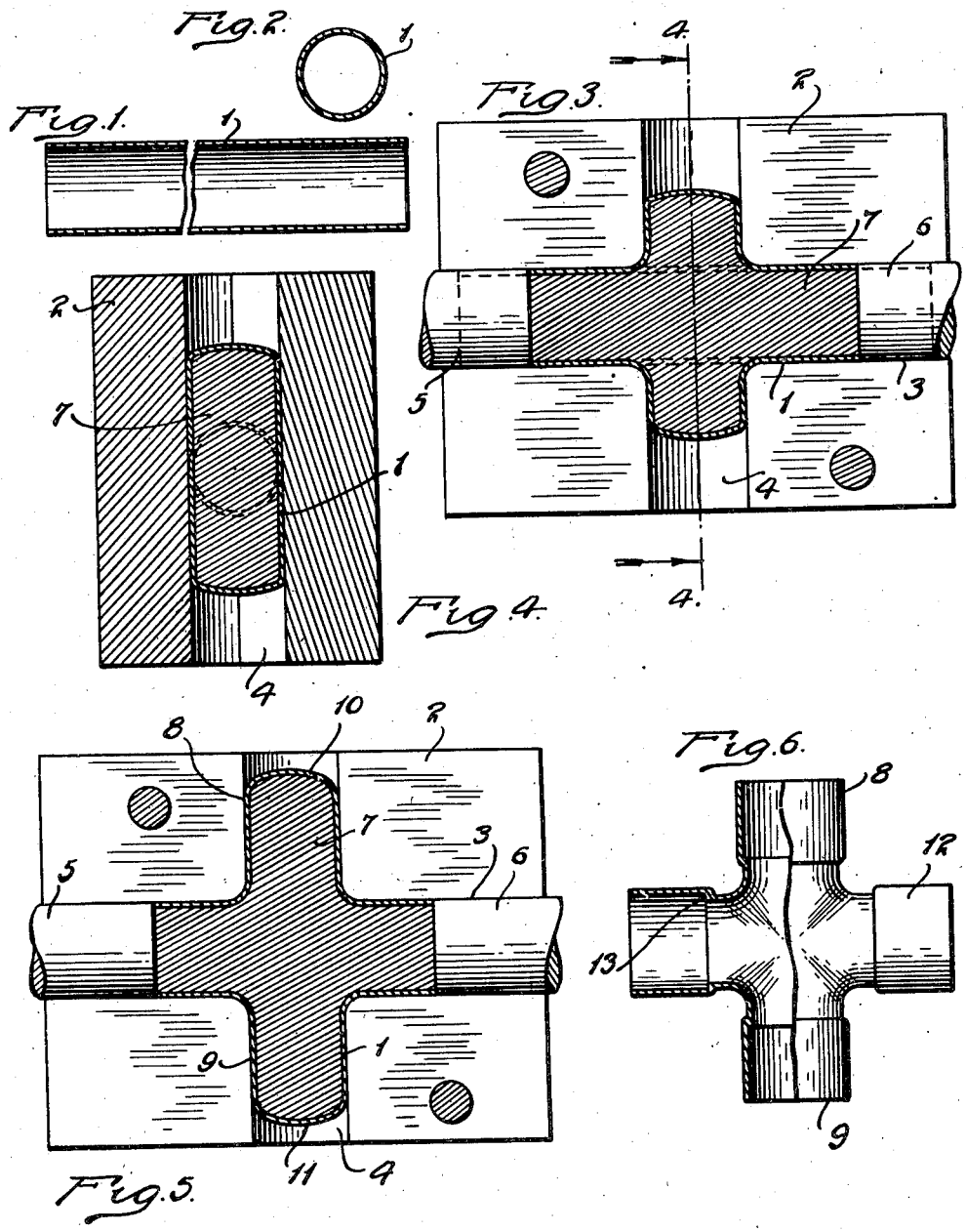
INVENTORS.
REX R. SEEBER
GRIFFITH N. THRESHER.
BY ALMON P. YOUNG.
Barnes, Kisselle, Laughlin & Raisch
ATTORNEYS.

INVENTORS.
REX R. SEEBER.
GRIFFITH N. THRESHER.
BY ALMON P. YOUNG.
Barnes, Kisselle, Laughlin & Raisch
ATTORNEYS.

March 22, 1938. R. R. SEEBER ET AL 2,111,695
METHOD OF MAKING PIPE FITTINGS
Filed March 23, 1934  3 Sheets-Sheet 3

INVENTORS
Rex R. Seeber
Griffith N. Thrasher &
BY Almon P. Young
Barnes, Kisselle, Laughlin & Raisch ATTORNEYS Patented Mar. 22, 1938

2,111,695

UNITED STATES PATENT OFFICE 2,111,695

METHOD OF MAKING PIPE FITTINGS

Rex R. Seeber, Griffith N. Thresher, and Almon P. Young, Houghton, Mich.

Application March 23, 1934, Serial No. 717,088

10 Claims. (Cl. 29—157)

This invention relates to pipe fittings and the method of making the same. More particularly the invention is concerned with metal pipe fittings such as T's and crosses and the method of making the same.

It is an object of this invention to produce a drawn seamless wrought metal fitting.

It is also an object of this invention to produce a wrought metal fitting by drawing the same from a tube.

This invention also contemplates a wrought metal fitting which is drawn from a seamless tube and which has a substantially uniform wall thickness throughout.

Briefly, the method of manufacturing this type of fitting comprises casting a plastic filler in a suitable length of preformed metal tube followed by compressing the filler and tube simultaneously while held in a suitable die to flow and draw the metal tube into the shape desired and thereafter trimming the fitting to size and belling the open ends of the fittings to receive the ends of the pipes which make up the pipe system.

In the drawings there is illustrated the preferred method of making the fitting, as well as two different types of the fittings.

Fig. 1 shows the wrought metal tube prior to having cast the filler therein.

Fig. 2 is a section of the tube.

Fig. 3 in the dotted lines shows the tube positioned in the die after the filler has been cast in the tube and prior to the pressing operation and in the full lines shows the tube after the pressing operation is partially completed.

Fig. 4 is a section along the line 4—4 of Fig. 3.

Fig. 5 shows the tube after the pressing operation has been completed.

Fig. 6 shows the completed cross with the drawn ends trimmed to size and all of the open ends belled.

Figure 7:
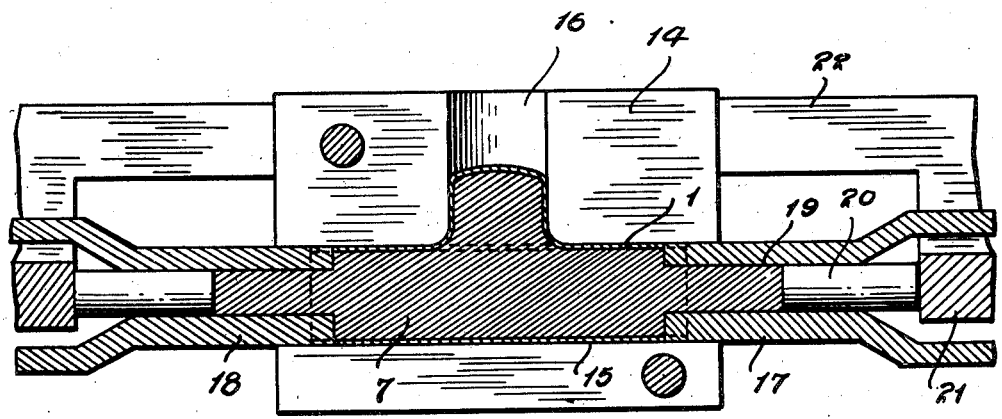
Figure 8:
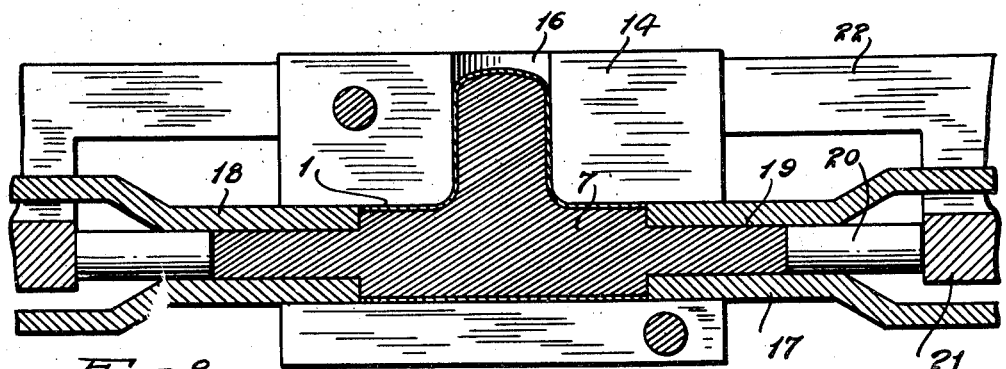
Figure 9:
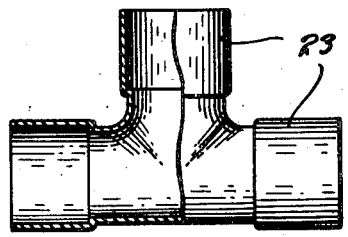

Figs. 7, 8 and 9 correspond to Figs. 3, 5 and 6 showing the pressing operation involved in the making of a T fitting with special types of plungers for taking care of the excess filler during the pressing operation.

Figure 10:
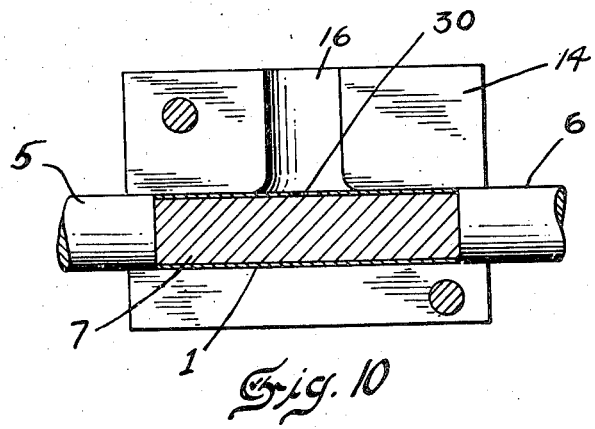
Figure 11:
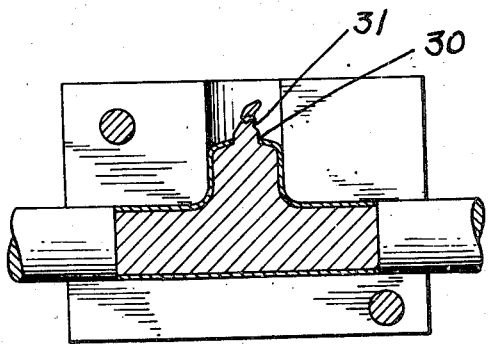
Figure 12:
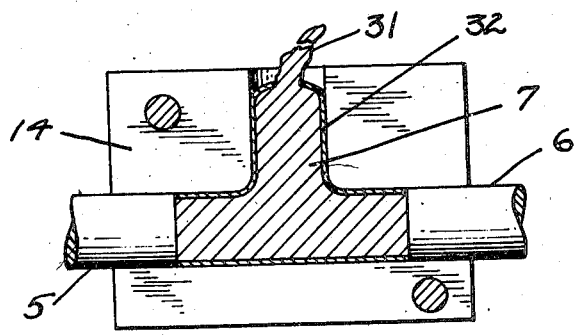

Figs. 10, 11 and 12 are views showing a modification of the principal method for forming T's wherein a portion of the excess plastic filler is extruded through a small opening in the side wall of the tube.

In the making of this type of fitting it is proposed to start initially with a tube 1 such as shown in Figs. 1 and 2. The length, diameter and wall thickness of the tube are a matter of choice depending upon the type of fitting desired.

The tube 1 may consist of any suitable metal or alloy of metals, preferably wrought metal, having those physical properties or characteristics which make it suitable for being drawn or pressed, such as, for example, copper, aluminum, Monel metal, zinc or magnesium. Wrought seamless drawn tube is preferred. When seamless wrought copper tube is used, heat treatment of the copper tube is optional. Good fittings were obtained both with annealed tube and with tube not annealed.

The tube 1, after being cut to the proper length, is next completely filled with a suitable filler 7. The filler may be pre-cast and inserted in cut section of the tube, but would need to be sufficiently over length in order that the volume excess in length will equal the volume deficiency due to the smaller diameter which is necessary to provide leeway for the insertion of pre-cast filler into the tube before pressing. This extra length would provide for lateral deformation of filler to expand and to contact the interior surface of the tubing. Preferably this filler may be cast in place while in a molten condition and then permitted to stand or otherwise cooled until solidified or in condition permitting it to be handled. It is essential that the filler completely fill the tube so that the volume of filler is equal to the volume of the tube and that air pockets within the filler or between the filler and the tube be avoided.

It is difficult to specify the exact physical characteristics of those materials which are suitable and operative as fillers. However, generally the filler should be solid at ordinary room temperature and capable of being melted out of the tube after the pressing operation at a temperature which will not cause harmful chemical or physical changes in the copper or whatever wrought metal from which the tube is made, nor should the filler have an affinity for, that is, "tin", the interior of the tube. Liquids such as water and oil have proved very unsatisfactory as fillers. With such fillers the tube is usually ruptured before the pressing operation is complete. Tar, pure rosin, a combination of tar and rosin, dry clay, and candle wax were all tried as fillers. Although these proved more practical than liquids, such as water and oil, yet the percentage of ruptures in the tube before the pressing operation was completed was too high to render these substances suitable as fillers. It may be that the unsuitability of these substances when used as fillers is due to the fact that the internal resistance and yield point of each of these substances is too low. The filler should be plastic. Fillers having an internal resistance and yield point equal to that of lead have proved very satisfactory. In actual practice Woods metal, an alloy of bismuth, lead, tin, and sometimes cadmium, has been found very suitable. The following formulas of Woods metal have been found very satisfactory:

*Melting point 65½° C.*

| | Parts by weight |
|---|---|
| Bismuth | 5 |
| Lead | 2¼ |
| Cadmium | 1¼ |
| Tin | 1¼ |

*Melting point 103° C.*

| | Parts by weight |
|---|---|
| Bismuth | 5.4 |
| Tin | 2.6 |
| Cadmium | 2.0 |

*Melting point 70° C.*

| | Parts by weight |
|---|---|
| Bismuth | 8 |
| Lead | 3 |
| Tin | 5 |

*Melting point 96° C.*

| | Parts by weight |
|---|---|
| Bismuth | 5.3 |
| Lead | 3.2 |
| Tin | 1.5 |

*Melting point 91½° C.*

| | Parts by weight |
|---|---|
| Bismuth | 5.2 |
| Lead | 4.0 |
| Cadmium | 0.8 |
| Tin | 0.0 |

*Melting point 71° C.*

| | Parts by weight |
|---|---|
| Bismuth | 5 |
| Lead | 4 |
| Cadmium | 2 |
| Tin | 2 |

*Melting point 70°–74° C.*

| | Parts by weight |
|---|---|
| Bismuth | 5 |
| Lead | 2.7 |
| Tin | 1.3 |
| Cadmium | 1.0 |

*Melting point 111° C.*

| | Parts by weight |
|---|---|
| Bismuth | 4.0 |
| Lead | 4.0 |
| Tin | 2.0 |

It will be noted that the melting points of these various alloys range from about 65½° C. to about 111° C. This range of temperature is a preferable operating range but may be raised or lowered within limits without departing from the invention. The melting point should not be less than room temperature nor so high that heating of the fitting to remove the filler will cause harmful chemical or physical changes in the metal.

After the tube 1 has been filled with the plastic filler and the filler cooled sufficiently so that it can be handled, the tube is inserted in the die 2. The die 2 is formed with crossed openings or bores 3 and 4 which form a cross fitting during the pressing operation. Only one-half of the die is shown but the other half is made exactly the same and is bolted, clamped, or otherwise secured to the half shown after the filled tube has been inserted in place and prior to the pressing operation. Opposed plungers 5 and 6 are arranged to operate in the bore 3. The plungers 5 and 6 may be operated hydraulically or by any other means well-known in the art. In forming a cross wherein branches of substantially the same length and diameter are desired, it is essential that the plungers 5 and 6 should each travel toward each other or toward the center of the die the same distance and preferably at the same speed. Preferably the plungers 5 and 6 should have a circumference at least equal to that of the ends of the tube 1 so that they will overlap the ends of the tube and compress not only the filler 7 but also the tube 1.

As the power is applied to the plungers 5 and 6 they travel substantially equal distances inwardly or toward the intersection of the bore 3 with the bore 4, thus not only applying opposed substantially equal pressures upon the ends of the tube 1 but also upon the filler 7. Inasmuch as those portions of the wall of the tube 1 in the openings 4 are unconfined, the filler 7 and these wall portions which are under pressure take the path of least resistance and travel outwardly from the center of the die in the opening 4. The pressure applied to the ends of the tube through the plungers 5 and 6 causes the metal in the tube to become plastic and flow. The same is true of the filler 7. The fact that the filler 7 is cast in the tube 1 assists in causing both the filler and the metal in the tube to flow together. This simultaneous flow of the metal and the filler may be due to the friction between the filler and the walls of the tube and/or to the adhesion between the filler and the walls of the tube caused by casting the filler in the tube.

Insofar as the operation of the plungers 5 and 6 are concerned the stroke of each may be a continuous single stroke or a succession of lesser strokes. As illustrated in Figs. 3 and 5, the plungers 5 and 6 operate simultaneously each making a continuous single stroke. At the end of the stroke the plungers are in the position shown in Fig. 5 and the tube has been pressed and the lateral extensions 8 and 9 pressed or drawn out of the same. After the tube has been drawn into the cross, as shown in Fig. 5, the cross is now removed from the die, the filler melted out in any suitable manner such as by placing the cross and filler in hot water, in case the filler has a melting point below the boiling point of water. After the filler is removed the lateral branches 8 and 9 of the cross are trimmed to remove the ends 10 and 11. Thereafter the open ends of the cross may be expanded in any suitable manner to form the bell ends such as shown at 12. The bell ends 12 receive the ends of the tube forming a part of the water or other system of which the finished fitting becomes a part. The ends of these tubes may be soldered or sweated into the bell ends 12 of the fitting. The shoulders 13 serve as stops to properly locate the end of the pipe in the fitting.

When this method of making a cross is pursued it is found that the walls of the fitting have a substantially uniform wall thickness throughout. The same holds true with a T made according to the method outlined below.

In making a T the tube 1 is filled with a filler in the same fashion as above described. Thereafter it is pressed in a die 14 having a main bore 15 and a single lateral bore 16 extending from the die outwardly to one end. In other words, the die 14 is formed with openings 15 and 16 suitably arranged to form a T. As in the case of the cross, the tube 1 and filler 7 are compressed simultaneously by the opposed plungers 17 and 18. However, inasmuch as the T has but a single lateral extension, the two plungers 17 and 18 will displace more filler than is necessary to form a lateral extension having substantially the same length, diameter and wall thickness as the other two extensions. If it is desired to have the drawn extension of a different or greater length and different wall thickness than that of the other two branches of the T, then no provision need be made for the excess displacement of filler. However, where a T is desired all the branches of which have substantially the same diameter and length and substantially uniform wall thickness throughout then provision must be made for the excess displacement of filler. To this end each of the plungers 17 and 18 is provided with a longitudinally extending opening 19 provided with a piston 20. Each piston 20 is stationary and may be mounted in any suitable manner. As shown the piston 20 is fixed to the bar 21 which in turn is supported by the bracket 22 fixed to the die 14.

The size of the openings 19 in the plungers 17 and 18, as well as the length of the stroke of the pistons 20 are properly calculated to permit extrusion from within tube 1 of an amount of filler 7 during the pressing operation sufficient to properly draw the lateral extension in the T. In other words, the openings 19 in the plungers 17 and 18 permit extrusion of an amount of filler roughly equal to that which would be displaced by either one of the plungers 17, 18 if the same were solid and the openings 19 omitted. After the tube has been pressed and drawn to the T shape, as shown in Fig. 8, the drawn extension is trimmed and the ends expanded to form the bells 23 in the same manner as that described above relative to the cross fitting.

In making a T fitting solid plungers such as 5 and 6 may be used and the excess filler can be removed by piercing a hole in the end wall of the branch in the bore 16 after the pressing operation is well under way and just before this branch reaches the rupture point. In practice a 3/8 inch hole was pierced in the end of the branch when it reached a length of 3/4 inch. The finished fitting has a substantially uniform wall thickness. The wall thickness of the finished drawn fitting may be the same as that of the original tube. The finished wall thickness will depend on the original length of the tube and the length of the draw.

Another way of taking care of the excess filler in making a T fitting where solid plungers such as 5 and 6 are used is as follows: The tube 1 is provided with a small hole 30 in its side wall before being inserted into a die such as 14, the hole being located in the tube at the proper position where a branch is desired. After the hole has been drilled or otherwise put in the tube at the proper position the tube is inserted in the die 14 with the center of the hole in exact alignment with the longitudinal axis of, and adjacent, the bore 16. As the plungers 5 and 6 move toward each other the wall of the tube is drawn into the bore 16 to form a branch 32 and at the same time a portion 31 of the filler is extruded through the small opening above mentioned. The size of the hole in the original piece of the tube will depend upon the wall thickness and length of the branch that is desired as well as upon the cross sectional area of the plungers and tube.

What is claimed is:

1. A method for making a fitting from a seamless wrought metal tube comprising completely filling the tube with a material having the characteristics of a plastic and solid at ordinary room temperature, applying equal and opposed pressures simultaneously to the ends of the tube and the filling material while sealing the filling material within the tube, and radially confining a part of the tube during the application of the opposed end pressures so that the metal flows parallel to the direction of application of the said pressures, and radially confining a second part of the tube so that the metal of this part flows in a direction transverse to that of the other part, the end portion of this second part being unconfined.

2. A method for making a fitting from a seamless wrought metal tube comprising filling the tube with Woods metal having a melting point between 65° and 111° C., completely radially confining the tube except for a cylindrical opening in the confining means along the side wall of the tube, applying opposed substantially equal pressures simultaneously during the entire pressing step to the ends of the tube and the filler to flow part of the filler and tube into the said opening to form a branch with a closed end and of substantially the same wall thickness and cross-sectional area as the tube, melting the filler to remove the same from the tube and branch to remove the end wall.

3. A method for making a fitting from a wrought metal tube comprising filling the tube with a material having the characteristics of a plastic by casting the filling material into the tube, completely radially confining the tube except for an opening in the confining means along the side wall of the tube, applying opposed pressures simultaneously and during the entire pressing step to the ends of the tube and the filler to flow part of the filler and tube into the said opening in the confining means to radially confine the same and to form a branch.

4. The method of making a pipe fitting which consists in filling a tube with a metal having a melting point which is substantially lower than that of the tube, then placing the filled tube while cold in a die having a cylindrical space therein of the size of the filled tube and one or more openings leading from said space, then applying pressure to the tube and filling at both ends of the filled tube and filling and thereby causing the tube and filling to expand into the said openings, and then subjecting the filled tube thus expanded to a temperature between the melting points of the tube and filling to thereby remove the filling.

5. The method of making a pipe fitting by cold working a metal tube which consists in placing within the tube a quantity of metal having a melting point which is substantially lower than that of the tube to form a core, then placing the tube and the metal core within the tube while cold in a die having a cylindrical space therein of the size of the tube and one or more cylindrical openings leading from said cylindrical space, then applying pressure to both ends of both the tube and the metal core within the tube to thereby cause the tube and the metal core within the tube to expand into said cylindrical opening or openings to form one or more branches and then subjecting the tube and metal core thus expanded to a temperature between the melting points of the tube and the metal core to thereby remove the metal core.

6. The method of making a pipe fitting by cold working a metal tube which consists in forming a core within the tube by placing within the tube a quantity of metal sufficient to fill the tube between the opposed plungers and having a melting point which is substantially lower than that of the tube, then placing the tube and the metal core within the tube while cold in a die having a cylindrical space therein of the size of the tube and one or more cylindrical openings leading from said space, then closing the ends of the tube with opposed plungers to seal the metal core within the tube, then applying pressure to the tube and the metal core at both ends of both the tube and the core by moving the opposed plungers towards each other thereby causing the tube and the metal core to expand into said cylindrical opening or openings to form one or more branches, and then subjecting the tube and metal core thus expanded to a temperature between the melting points of the tube and core to remove the said core.

7. The method of making a pipe fitting by cold working a metal tube which consists in placing within the tube a quantity of metal having a melting point which is substantially lower than that of the tube to form a core, then placing the tube and the metal core within the tube while cold in a die having a cylindrical space therein of the size of the tube and a cylindrical opening leading from said cylindrical space, then applying pressure to both ends of both the tube and the metal core within the tube to thereby cause the tube and the metal core within the tube to expand into said cylindrical opening to form a branch and simultaneously flowing some of the metal core out of one or both ends of the tube and then subjecting the tube and the remaining portion of the metal core thus expanded to a temperature between the melting points of the tube and the metal core to thereby remove the remainder of the said metal core.

8. The method of making a pipe fitting by cold working a metal tube which consists in forming a core within the tube by placing within the tube a quantity of metal sufficient to fill the tube between the opposed plungers and having a melting point which is substantially lower than that of the tube, then placing the tube and the metal core within the tube while cold in a die having a cylindrical space therein of the size of the tube and a cylindrical opening leading from said space, then closing the ends of the tube with opposed plungers to seal the metal core within the tube, then applying pressure to the tube and the metal core at both ends of both the tube and the core by moving the opposed plungers towards each other thereby causing the tube and the metal core to expand into said opening to form a branch and simultaneously flowing out of one or both ends of the tube a portion of the metal core equal to the difference between the total quantity of metal core displaced by the opposed plungers and that expanded or forced into the cylindrical opening to form a branch, and then subjecting the tube and remaining portion of the metal core thus expanded to a temperature between the melting point of the metal and the core to thereby remove the remaining portion of the metal core.

9. The method of making a pipe fitting by cold working a metal tube which consists in placing within the tube a quantity of metal having a melting point which is substantially lower than that of the tube to form a core, then placing the tube and the metal core within the tube while cold in a die having a cylindrical space therein of the size of the tube and a cylindrical opening leading from said cylindrical space, then applying pressure to both ends of both the tube and the metal core within the tube to thereby cause the tube and the metal core within the tube to expand into said cylindrical opening to form a branch and simultaneously flowing some of the metal core outwardly of one or both ends of the metal core and then subjecting the tube and the metal core thus expanded to a temperature between the melting points of the tube and the metal core to thereby remove the remainder of the said metal core.

10. The method of making a pipe fitting by cold working a metal tube which consists in forming a core within the tube by placing within the tube a quantity of metal sufficient to fill the tube between the opposed plungers and having a melting point which is substantially lower than that of the tube, then placing the tube and the metal core within the tube while cold in a die having a cylindrical space therein of the size of the tube and a cylindrical opening leading from said space and then applying opposed plungers to the ends of the tube and the metal core within the tube, then applying pressure to the tube and the metal core at both ends of both the tube and the core by moving the opposed plungers towards each other thereby causing the tube and the metal core to expand into said opening to form a branch and simultaneously flowing some of the metal core by one or both end faces of the plungers, and then subjecting the tube and the metal core thus expanded to a temperature between the melting point of the tube and the metal core to remove the said core.

REX R. SEEBER.
GRIFFITH N. THRESHER.
ALMON P. YOUNG.